(12) United States Patent
Thomas et al.

(10) Patent No.: US 8,002,253 B2
(45) Date of Patent: Aug. 23, 2011

(54) BUTTON ACTUATED DETENT SYSTEM

(75) Inventors: Adam Thomas, Aurora, IL (US); Wojciech Pierga, Glenview, IL (US)

(73) Assignee: Robert Bosch GmbH, Stuttgart (DE)

( * ) Notice: Subject to any disclaimer, the term of this patent is extended or adjusted under 35 U.S.C. 154(b) by 479 days.

(21) Appl. No.: 12/214,691

(22) Filed: Jun. 20, 2008

(65) Prior Publication Data

US 2009/0315237 A1     Dec. 24, 2009

(51) Int. Cl.
     *B25Q 3/18*     (2006.01)
(52) U.S. Cl. ........... 269/63; 83/477.2; 83/471.2; 74/527
(58) Field of Classification Search ............ 269/63; 83/471.3, 473, 490, 581, 477.2, 486.1; 409/224; 108/104, 142; 33/471; 74/527–529, 531–533
     See application file for complete search history.

(56) References Cited

U.S. PATENT DOCUMENTS

| | | | | |
|---|---|---|---|---|
| 3,839,624 | A | * | 10/1974 | Isaksen .................. 235/61 GM |
| 4,088,290 | A | * | 5/1978 | Novello .......................... 248/118 |
| 4,128,745 | A | * | 12/1978 | Marsilio et al. ............ 200/16 C |
| 5,025,520 | A | * | 6/1991 | Watkins ............................. 7/163 |
| 5,249,496 | A | | 10/1993 | Hirsch et al. |
| 5,462,380 | A | * | 10/1995 | Peek et al. ..................... 403/329 |
| 6,474,206 | B1 | | 11/2002 | Brunson |
| 6,513,412 | B2 | | 2/2003 | Young |
| 7,114,425 | B2 | | 10/2006 | Romo et al. |
| 7,210,415 | B2 | * | 5/2007 | Brunson ........................ 108/104 |
| 7,302,879 | B2 | | 12/2007 | Bergmann |
| 2002/0088327 | A1 | | 7/2002 | Young |
| 2002/0100352 | A1 | * | 8/2002 | Dils et al. ......................... 83/473 |
| 2004/0089125 | A1 | | 5/2004 | Schoene et al. |

FOREIGN PATENT DOCUMENTS

| | | |
|---|---|---|
| EP | 1 410 886 | 4/2004 |
| EP | 1 837 142 | 9/2006 |
| EP | 1 719 593 | 11/2006 |

* cited by examiner

*Primary Examiner* — George Nguyen
(74) *Attorney, Agent, or Firm* — Greer, Burns & Crain, Ltd.

(57) ABSTRACT

A detent system that includes a plurality of detent recesses formed in a first component, a detent pin that selectively engages at least one of the detent recesses, a linkage connected to the detent pin, and a detent button that is associated with a second component. There is preferably a slot formed in at least one of the detent button and the detent pin, where each slot slidably receives an end portion of the linkage. The detent system is preferably configured and arranged such that applying a force to the detent button to move the detent button in a first direction causes the linkage to move in a second direction, which is different than the first direction, thereby resulting in disengagement between an engaging portion of the detent pin and a relevant one, or more, of the detent recesses. Such disengagement allows for relative movement between the two components.

16 Claims, 10 Drawing Sheets

BUTTON ACTUATED DETENT SYSTEM

The present invention relates generally to a button actuated detent system, and more particularly to a button actuated detent system for use in positioning a rotatable body in a predetermined position, such as used in locating a rotatable table in position at a predetermined angle with respect to a base in a miter saw or other power tool. The invention also relates to a method of making a component that includes detent recesses.

BACKGROUND OF THE INVENTION

Miter saws, and other types of power tools, as well as other devices, frequently use a detent system to assist the user in positioning a rotatable component at any one of a number of preset angles with respect to a base. Many detent systems are somewhat inconvenient to use and/or to square one component with respect to the other. Additionally, many detent systems lack a desired degree of accuracy of the detent angles. One of the causes of such lack of accuracy is that the detent recesses are formed by casting, or are stamped on a strip that is attached to the rotatable component.

BRIEF SUMMARY OF THE INVENTION

Embodiments of the present invention relate to a detent system that includes a plurality of detent recesses formed in a first component, a detent pin configured and arranged to selectively engage at least one of the detent recesses, a linkage operatively connected to the detent pin, and a detent button that is associated with a second component that is different from said first component, wherein the first and second components are configured and arranged for relative movement therebetween. There is preferably a slot formed in at least one of the detent button and the detent pin, where each slot slidably receives an end portion of the linkage. For example, the detent button may be operatively connected to the linkage via a button slot formed within the detent button.

The detent system is preferably configured and arranged such that applying a force to the detent button to move the detent button in a first direction causes the linkage to move in a second direction, which is different than the first direction, thereby resulting in disengagement between an engaging portion of the detent pin and a relevant one, or more, of the detent recesses. Such disengagement allows for relative movement between the two components.

Embodiments of the invention also relate to a method of making a base of a miter saw, where the method includes the steps of: preparing a cast to create a base of a miter saw, wherein the cast lacks projections for creating detent recesses in the base; pouring molten material into the cast to form the base of a miter saw; separating the base from the cast; and machining a plurality of detent recesses into the base. Such a method is believed to provide better accuracy for the detent angles than a method in which the detent recesses are cast into the base.

DESCRIPTION OF THE DRAWINGS

FIG. 2A shows the detent pin engaged with one of the detent recesses, and FIG. 2B shows the detent pin disengaged from the detent recesses;

FIG. 11A shows the cradle assembly in the state with no downward force being applied to the button, and FIG. 11B shows the state in which a downward force has been applied to the button.

DETAILED DESCRIPTION

Figure 1:
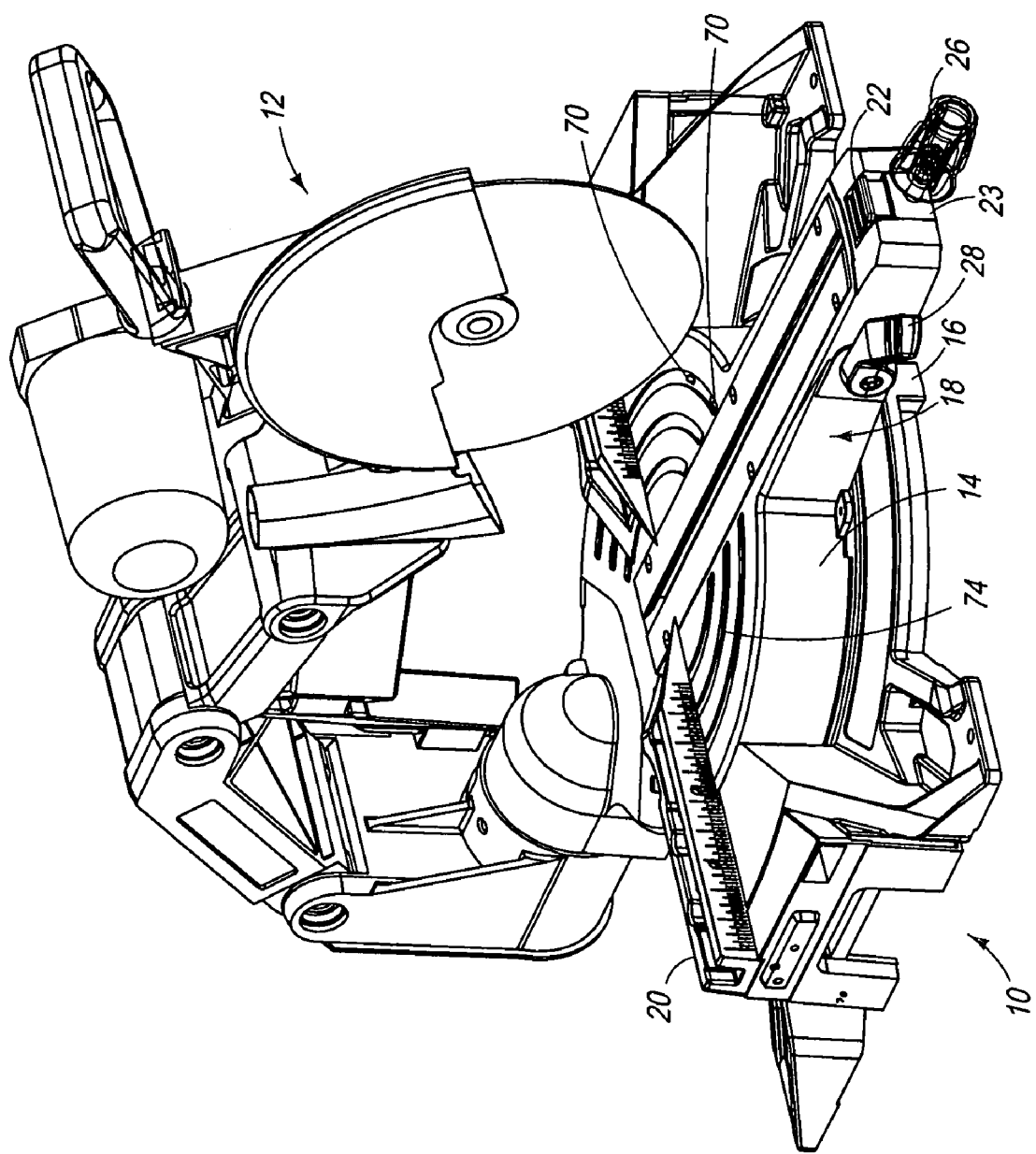
FIG. 1 is a perspective view of a miter saw that includes an embodiment of a button actuated detent system of the present invention.

Turning now to the drawings, and particularly FIG. 1, one example of an embodiment of a device including the present button actuated detent system is represented by miter saw 10, which generally includes a saw blade and motor assembly 12 that is operatively connected to a table 14, which is seated upon a base 16. The table 14, which includes a miter arm 18, but is otherwise generally circular in top view, rotates about a pivot axis with respect to the base 16. The miter saw 10 includes the button actuated detent system of the present invention, which enables the user to quickly locate the cutting line of the saw at a predetermined angular position with respect to a workpiece, which workpiece would be seated upon upper surface of the base and aligned along the side of and parallel to the fence 20.

It should be noted that although this application describes the present detent system in conjunction with a miter saw, it is contemplated that the detent system could be utilized for resisting or arresting the rotary motion of one component relative to another component in any one of a number of different types of devices.

Although the cutting line of the saw can be set at any angle within its range, there are a set of angles that users most frequently cut (such as 0°, 15°, 22.5°, 31.6°, 45° and 60°. Of course, other pre-determined angles may also be selected. To assist the user in quickly and repeatably positioning the cutting line of the saw at these frequently used angles, the present detent system can be used to properly position the table 14 with respect to the base 16.

Figure 2A:
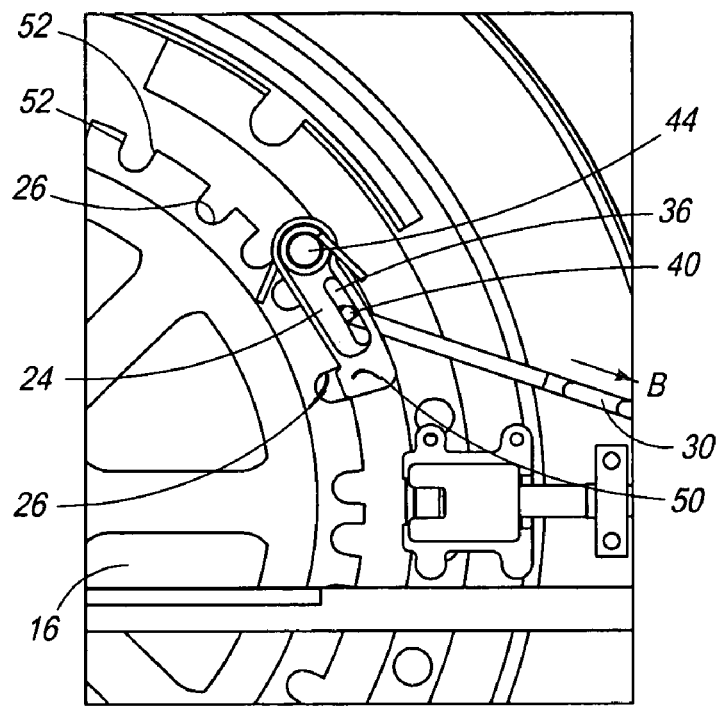
FIGS. 2A and 2B are schematic views of an embodiment of the detent pin and the detent recesses of the present invention, where
Figure 2B:
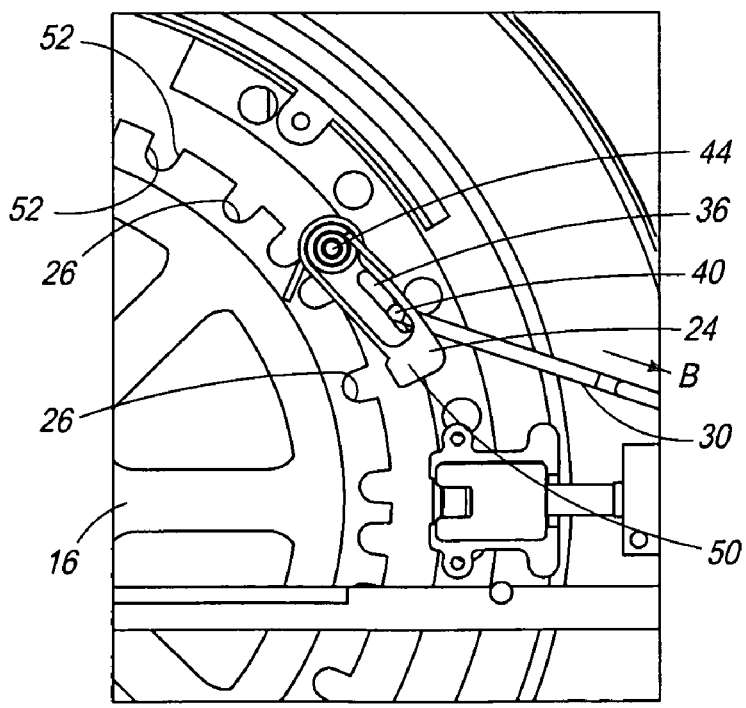
Figure 3:
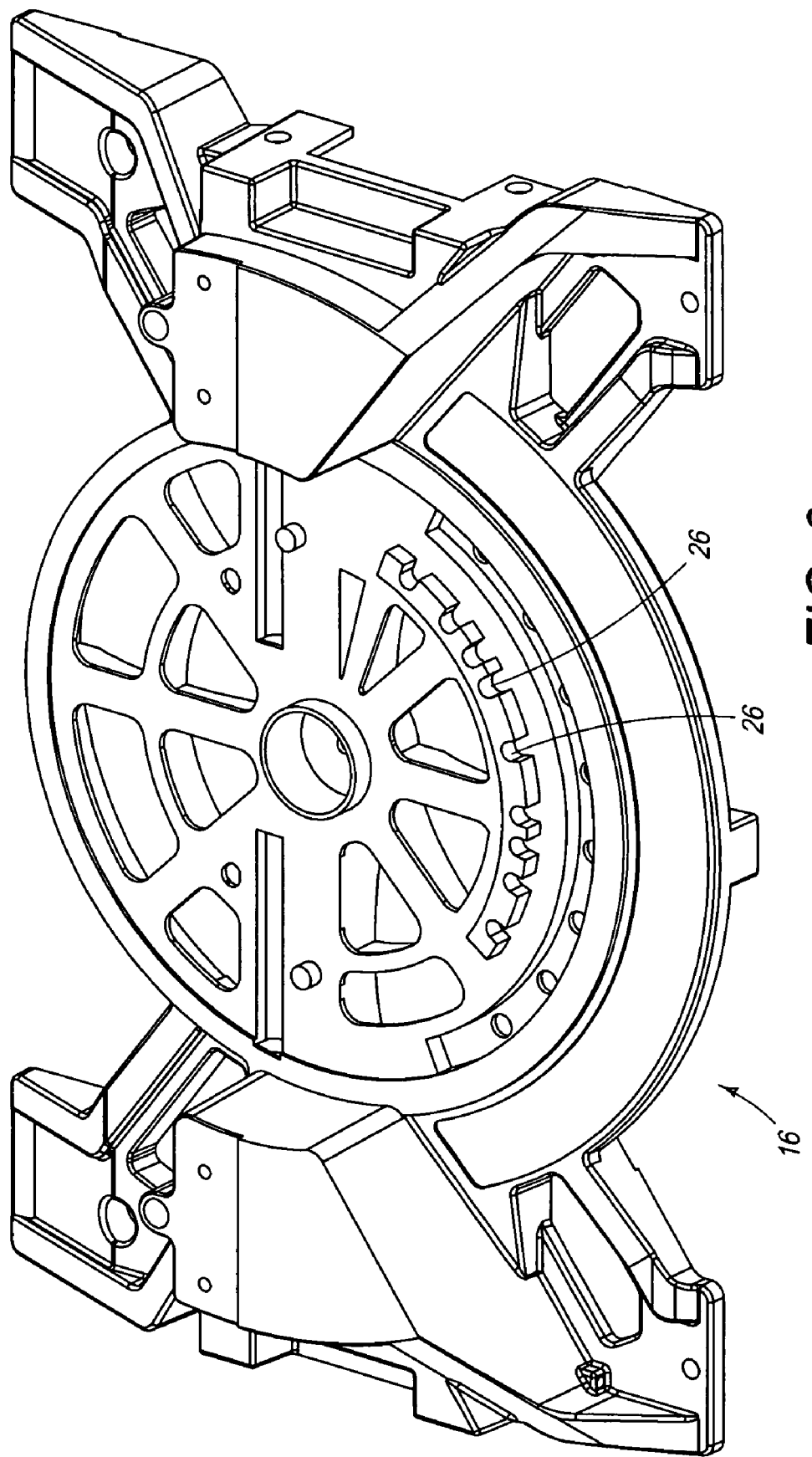
FIG. 3 is a schematic view of the upper surface of a base of the miter saw of FIG. 1, showing an embodiment of the detent recesses of the present invention.

The present detent system preferably includes a detent pin 24, such as shown in FIGS. 2A and 2B, and a plurality of detent recesses 26, where the detent pin is configured to mate with one of the detent recesses. As can be seen in FIG. 3, which is a view of the upper surface of base 16, the detent recesses 26 are formed along an arc. Briefly, when the pin 24 is not engaged with any of the detent recesses 26 (as in FIG. 2B), the user can rotate the table 14 with respect to the base 16 to the desired miter angle, and when the desired angle is found, the user engages the detent pin 24 with the nearest detent recess 26 (as shown in FIG. 2A).

Figure 4:
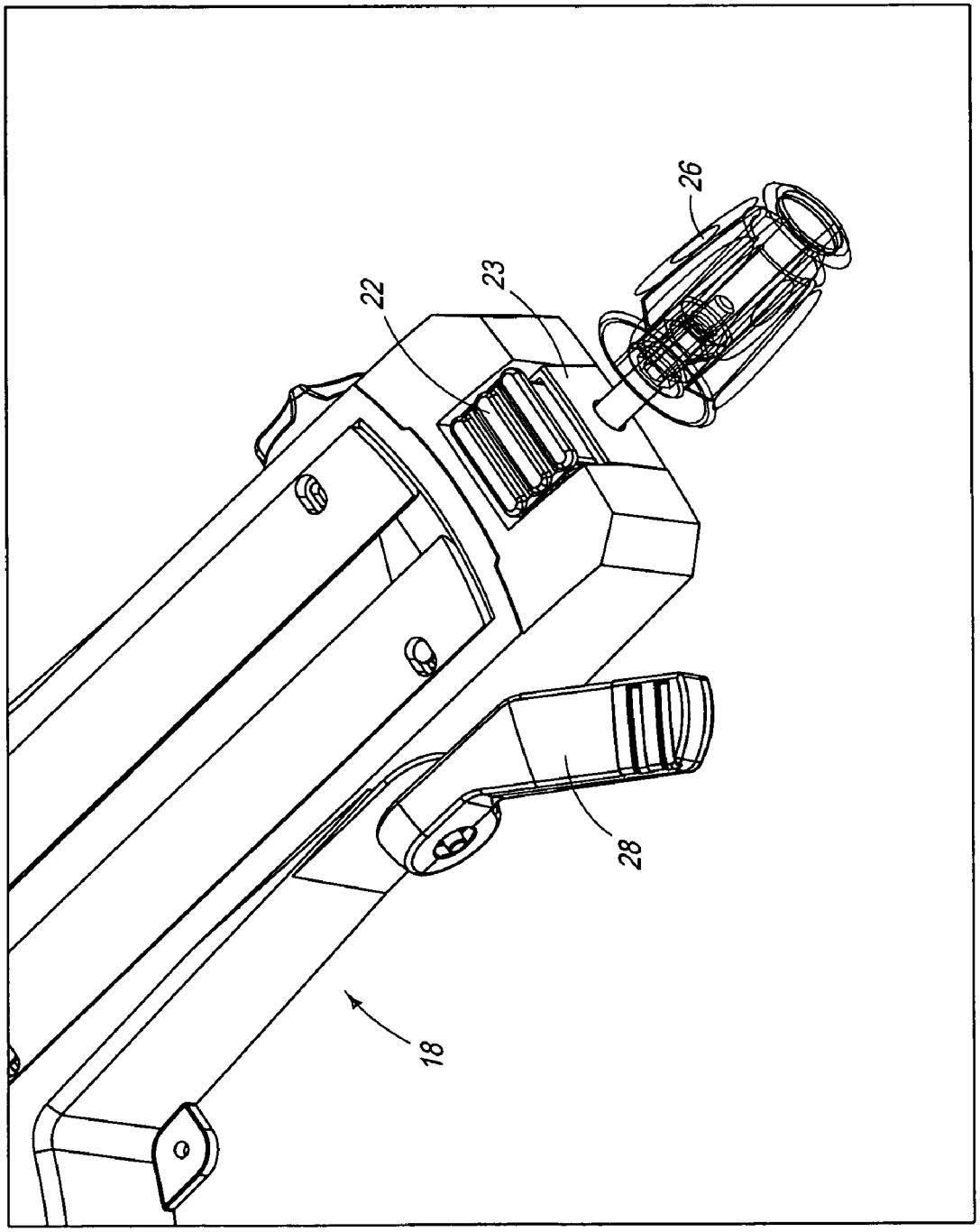
FIG. 4 is an enlarged top perspective view of the miter arm portion of the miter saw of FIG. 1.

FIG. 4 is a close-up view of the miter arm 18 of FIG. 1, which miter arm includes a miter detent button 22 seated within a button cradle 23, and a miter lock knob 27 for securing the table 14 in the desired angular position with respect to the base 16. The miter detent button 22 is used for engaging/disengaging the detent pin 24 and the detent recess 26, and the lock knob 27 is used for activating a locking assembly that prevents rotary motion between the table and the base after pin/recess engagement. The locking assembly is also used to prevent such relative rotary motion when the user selects an angle other than one of the frequently used angles represented by the detent recesses. In other words, regardless of whether the user selects one of the pre-set angles of the detent system or another angle that is not represented by the detent system, the locking assembly will be used.

The lock knob 27 may activate a locking assembly, such as the one described in co-pending U.S. patent application Ser. No. 11/978,846, filed Oct. 30, 2007, the entirety of which is incorporated herein by reference, or it may activate another type of locking mechanism. Since the locking assembly does not constitute part of the present invention, further details of the locking assembly are not necessary.

FIG. 4 also shows a bevel lock lever 28, which is used to lock the saw blade and motor assembly 12 at the desired bevel angle. As with the locking mechanism, the bevel lock is not part of the present invention, and thus further details are not necessary.

Figure 5:
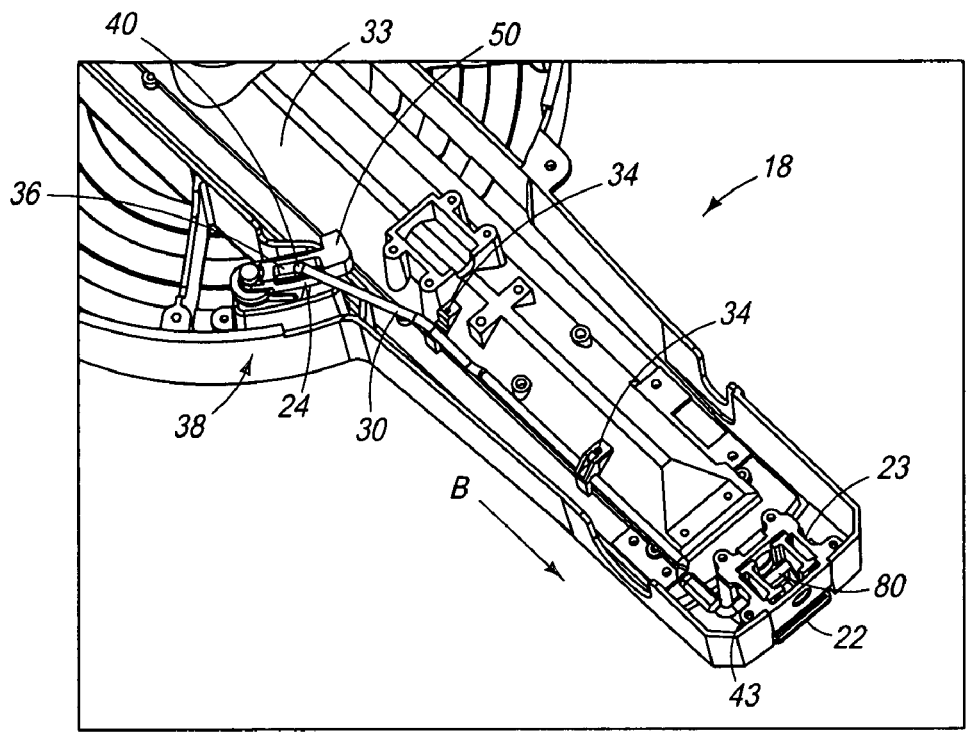
FIG. 5 is an enlarged bottom perspective view of the miter arm portion of the miter saw of FIG. 1.
Figure 6:
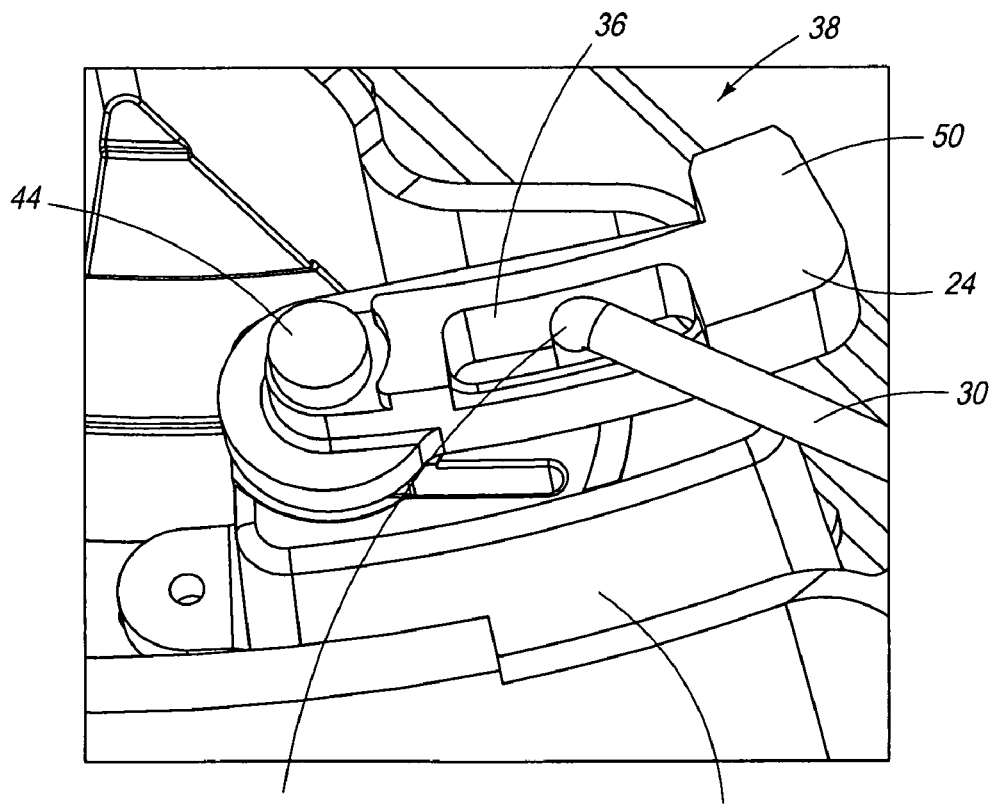
FIG. 6 is an enlarged view of the detent carriage assembly of FIG. 4.

Turning now to FIGS. 5 and 6, a description of some of the details of one embodiment of the present detent system will be provided, where FIG. 5 is a view of the underside of miter arm 18, and FIG. 6 is a close-up of the area near the detent pin 24. In this embodiment of the detent system, detent button 22 is operatively connected to one end 80 of a linkage 30, which is maintained in position on the underside 32 of miter arm 18 by one or more linkage guides 34. Although two linkage guides 34 are shown, the number of linkage guides may be greater than or less than two, if desired. The other end 40 of linkage 30 is slidably connected to detent pin 24 via a pin slot 36.

The details of the connection between linkage 30 and detent pin 24, which connection assembly will be referred to as the detent carriage assembly 38, will be described with reference to FIGS. 6-9. The end 40 of linkage 30 is preferably bent, such as at bend 42 of FIG. 9, to maintain the seating of linkage 30 within pin slot 36 of detent pin 24.

Detent pin 24 is preferably formed as a pivotable bar that pivots about a pivot shaft 44 that is inserted though through hole 46. Pivot shaft 44 may be in the form of a bolt whose threaded end is received by a complementary threaded aperture 45 in a bore 47 formed in detent pin carriage 48.

Detent pin 24 preferably includes an engaging portion 50 in the form of a projection extending from one side of pin 24, which engaging portion 50 is configured to engage with one of the detent recesses 26. In the embodiment shown, detent pin 24 includes a single engaging portion 50 for engagement with a single one of the detent recesses 26.

However, it is contemplated that two, or more, engaging portions may be provided for simultaneous engagement with a corresponding number of detent recesses. Also, it is contemplated that detent pin 24 may be provided with a second engaging portion on the opposite side of engaging portion 50 shown (but still on the same end as current engaging portion 50), as well as being provided with a second pin slot, so that pin 24 is symmetric about its longitudinal axis. Such a configuration could facilitate assembly by rendering harmless any inversion of pin 24 upon detent pin carriage 48. Of course in such a configuration, only the engaging portion that faces the detent recesses would be able to engage with the recesses.

In the preferred embodiment, engaging portion 50 is preferably wedge-shaped, as are the sides 52 of the detent recesses 26 (FIGS. 2A and 2B). Such wedge-shape of the engaging portion 50 and detent recess sides 52 minimizes or prevents a gap between the engaging portion and the detent recess when they are engaged. Preferably, the angle of such wedges is the same for both the engaging portion 50 and the detent recess sides 52. If such wedge angle is too large, the engaging portion 50 of the detent pin 24 may come out of the detent recess 26 when a rotational moment is applied to the table 14. In one embodiment, the wedge angle is preferable approximately 10°.

The engaging portion 50 is preferably biased towards engagement with one of the detent recesses 26 by a detent spring 54. Detent spring 54 is preferably a torsion spring that has a first end 56 operatively connected to detent pin 24, and a second end 58 operatively connected to detent pin carriage 48. Other types of springs, or even other types of biasing means, may also be used in place of the torsion spring.

Figure 7:
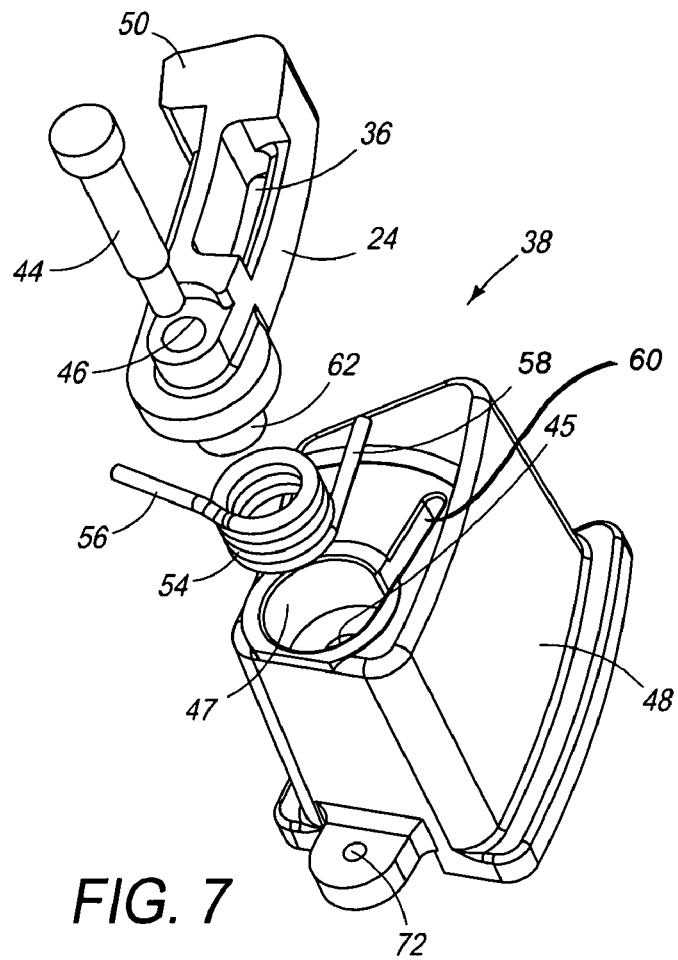
FIG. 7 is an exploded view of the detent carriage assembly of FIG. 6.

The exploded view of FIG. 7 shows how detent pin carriage 48 includes a slot 60 for the connection of second end 58 thereto. Although not shown, a similar slot is also preferably provided in the detent pin 24 for the connection of first end 56 and the detent pin. Of course, other means of forming appropriate connections are also contemplated as being within the scope of the invention. Additionally, boss 62 also increases the amount of engagement between bolt 44 and detent pin 24, thereby reducing tilting of pin 24, in the axial direction.

FIG. 7 also shows how detent pin 24 includes a boss 62. The coil portion of spring 54 preferably surrounds boss 62, whereby the boss and the spring are concentric, and bore 47 preferably surrounds the coil portion of spring 54. Thus, both the boss 62 and the bore 47 help to maintain spring 54 in the appropriate position.

Figure 8:
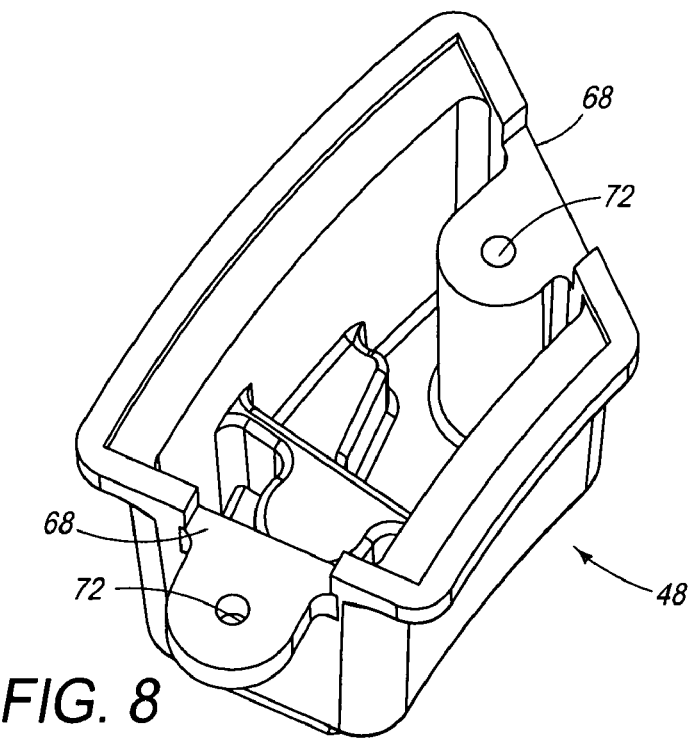
FIG. 8 is a perspective view of the detent carriage of FIG. 7, shown inverted from the FIG. 7 view.
Figure 10:
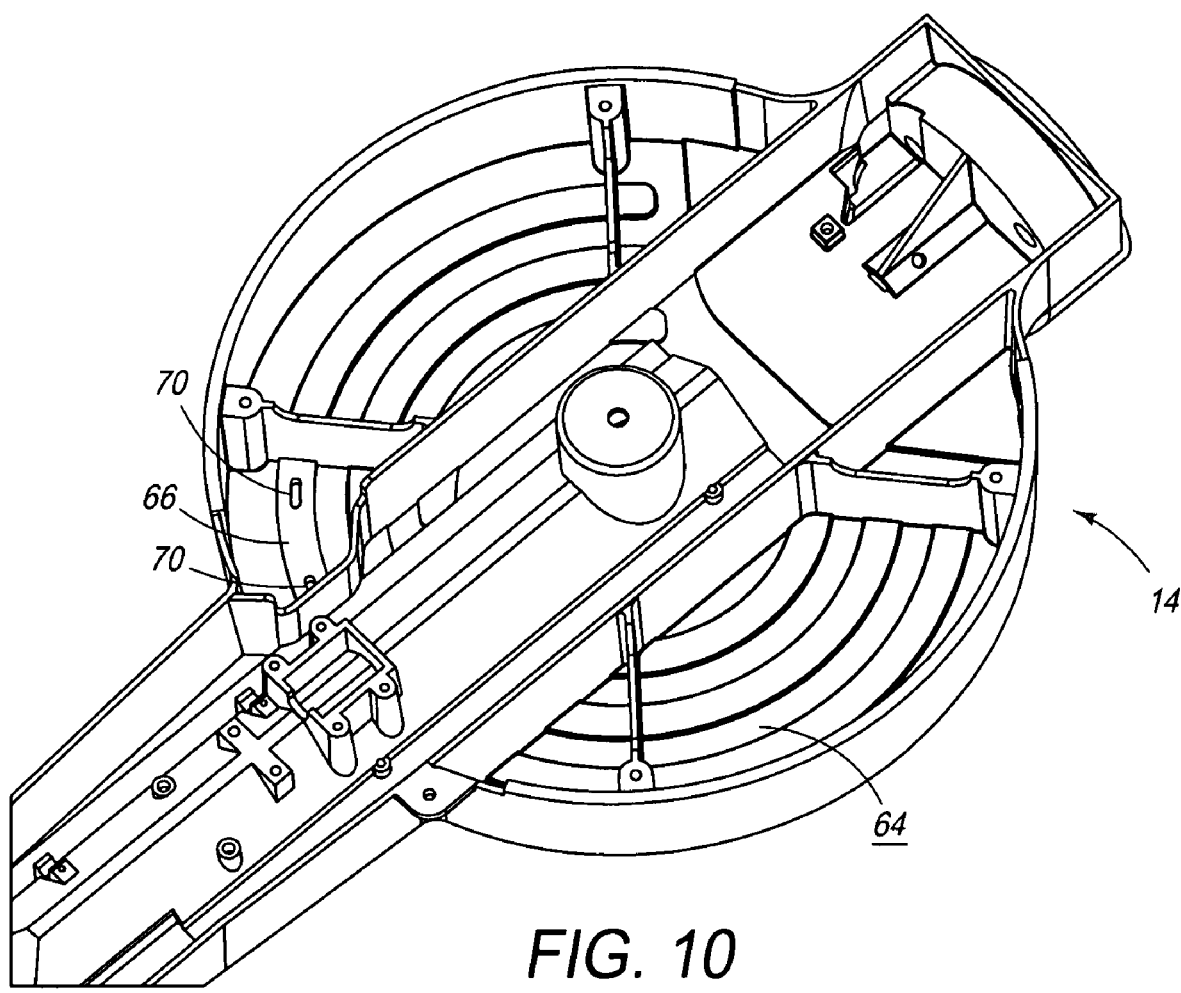
FIG. 10 is a perspective view of the underside of the table of the miter saw of FIG. 1, showing where the FIG. 6-8 embodiment of the detent carriage can be attached to the table.

Turning now to FIGS. 8 and 10, the manner in which the detent pin carriage assembly 38 is attached to the table 14 will be described. The underside 64 of table 14 is shown in FIG. 10. A detent carriage track 66 is formed on table underside 64 in at least the area where the detent carriage 48 will be seated, but such guide may also be formed in a generally circular shape on most of the underside 64 to provide additional strength to the table 14.

FIG. 8 shows how detent pin carriage 48 includes detent carriage guides 68, which are in the form of notches that are configured to cooperate with detent carriage track 66. In other words, the notches of guides 68 (FIG. 8) of carriage 48 are sized to slide along track 66 (FIG. 10) on table underside 64.

In order to secure the detent pin carriage 48 (and the reminder of carriage assembly 38) to table underside 64 after the guides 68 are slid along the track 66 to the desired position, a bolt is inserted through each slot 70 (FIG. 10) of table 14, from the upper side (i.e., the side opposite to that shown in FIG. 10). The bolts are then screwed into threaded bolt apertures 72 (FIG. 8) of detent pin carriage 48 so that the hollow surface of carriage 48 (i.e., the upper surface shown in the FIG. 8 view) faces table underside 64. As discussed more fully below, the ability to adjust the location of carriage 48 with respect to table 14 by using bolt slots 70, track 66 and guide 68 is important because such adjustment is used when squaring the saw blade with respect to the miter saw fence.

In the embodiment shown, carriage track 66 (FIG. 10) is in the form of an elongated projection, and detent carriage guide 68 (FIG. 8) is in the form of two notches. However, it is contemplated that other cooperating configurations could also be used, such as having one or more projections on carriage guide 48 that can mate with one or more notches on table underside 64, or even that other types of cooperating configurations could be used.

Figure 9A:
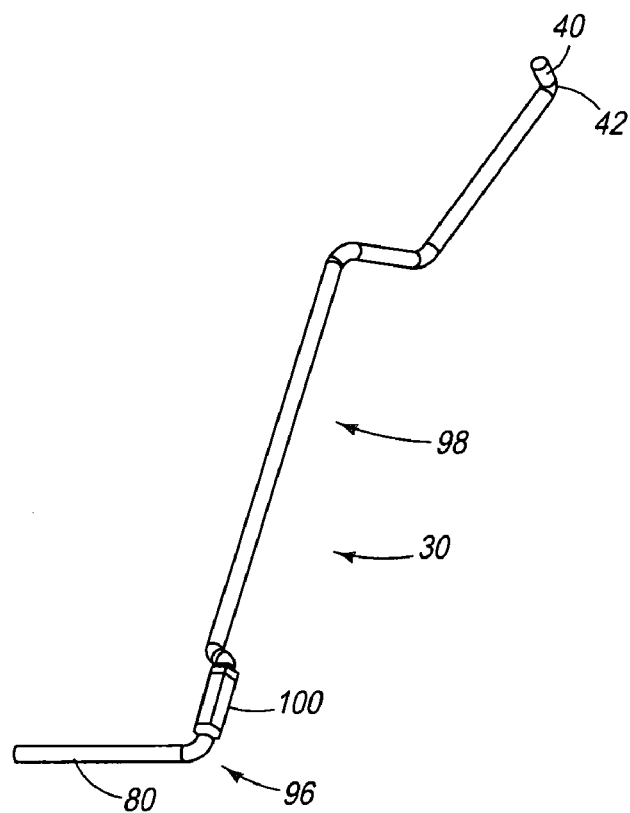
FIG. 9A shows one embodiment of the linkage of the present invention.
Figure 11A:
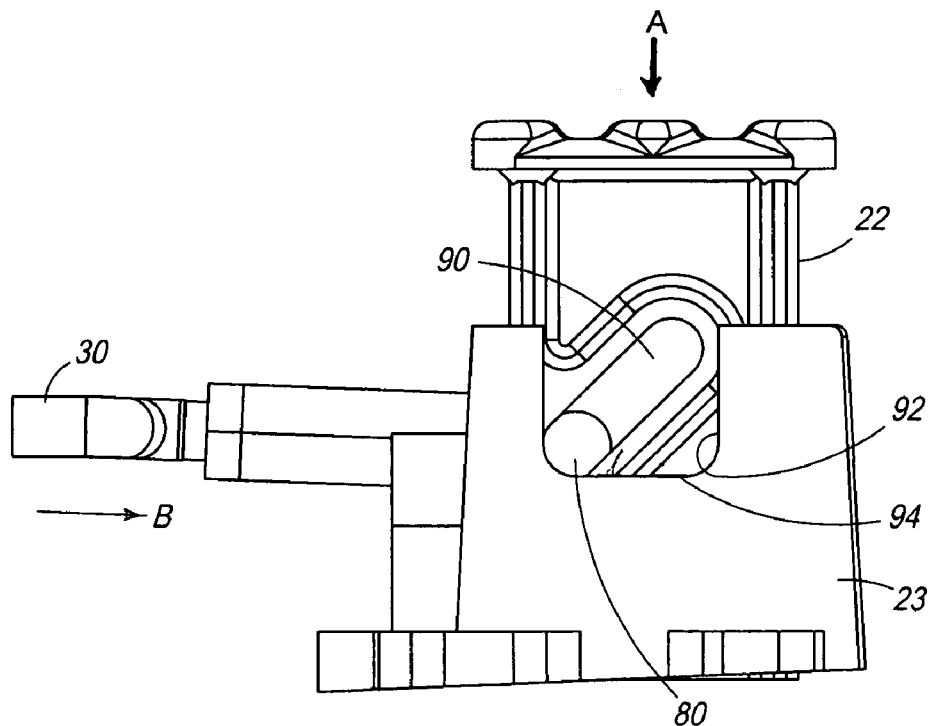
FIGS. 11A and 11B show side views of an embodiment of the button cradle assembly of the present invention, where
Figure 11B:
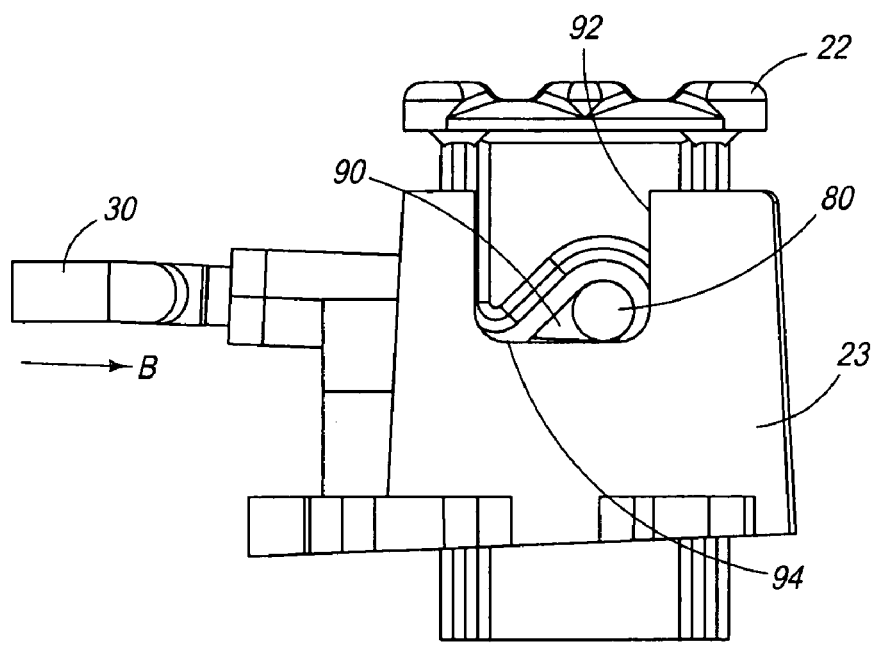

Turning now to FIGS. 9A, 11A and 11B, the operation of the detent button 22, and how the detent button is connected to and moves linkage 30, will be described. Detent button 22 is operatively connected to linkage 30 at the first linkage end 80 via button slot 90, which extends completely across button 22. Detent button 22 is slidably seated within button cradle 23 such that when a force is applied along arrow A (FIG. 11A), the button moves in a first direction (which is the same direction as that designated by arrow A) until reaching the position shown in FIG. 11B.

Button cradle 23 includes a cutout portion 92 on each side thereof (with only one side being shown in FIGS. 11A and 11B), and each cutout portion 92 includes a base portion 94 that preferably extends generally perpendicular to first direction A. Both base portions 94 cooperate to serve as a seat for the first end 80 of linkage 30, which first end 80 rests upon both base portions 94 before and after passing through button slot 90. As can be seen in FIGS. 11A and 11B, button slot 90 is angled and extends in an oblique direction with respect to both first direction A and base portion 94.

In operation, applying a force along first direction A to the detent button 22 to move the detent button in this first direction causes the linkage 30 to move in a second direction (designated by arrow B). Due to the connection between the second end 40 of linkage 30 and pin slot 36 of detent pin 24 (as shown in FIG. 2A), the detent pin 24 pivots about pivot shaft 44, thereby resulting in disengagement between the engaging portion 50 of the detent pin 24 and the relevant detent recess 26, such as shown in FIG. 2B. In other words, pushing miter detent button 22 with a force along direction A (FIG. 11A), causes the detent pin 24 to be changed from the engaged state of FIG. 2A to the disengaged state of FIG. 2B, thereby allowing relative movement between the table 14 and the base 16.

As can be seen when comparing FIG. 11B, in which button 22 has been pushed in first direction A, with the state shown in FIG. 11A, in which the button has not been pushed, applying a force in first direction A is converted to movement of linkage 30 in second direction B. Such conversion is the result of cooperation between the obliquely extending button slot 90, the base portion 94 of the cutout portion 92 and the first end 80 of the linkage 30.

More specifically, when button 22 is pushed in first direction A, the first end 80 of the linkage 30 is forced in second direction B along base portion 94 by button slot 90 due to its oblique angle, thereby changing the location of first end 80 from the FIG. 11A location (with end 80 shown to the left in this view) to the FIG. 11B location (with end 80 shown to the right in this view). Preferably, button slot 90 is angled within the range of approximately 35-55° with respect to base portion 94, and more preferably, it is angled at approximately 45°.

The reverse sequence of events happens when the force on detent button 22 is removed. More specifically, when detent button 22 is released (i.e., the force in first direction A is no longer being applied), the detent button 22 moves in a third direction, which is opposite to first direction A, which movement is caused by movement of linkage 30 in a fourth direction, which is opposite to second direction B. Such releasing of the detent button 22 (changing from the FIG. 11B state to the FIG. 11A state) results in engagement between the engaging portion 50 of the detent pin 24 and the relevant detent recess 26 (i.e., the detent pin 24 goes from the FIG. 2B state to the FIG. 2A state), thereby hindering relative movement between the table 14 and the base 16.

In the embodiment shown and described, detent button 22 moves in the direction opposite to first direction A due to the bias supplied by spring 54 of the detent carriage assembly 38, which bias is conveyed along linkage 30. However, it is also contemplated that detent button 22 may be biased upward (i.e., opposite to first direction A) by its own spring, or other biasing means, which, for example, could be provided between button cradle 23 and detent button 22.

Next, the details of embodiments of linkage 30 will be discussed. The embodiment of linkage 30 shown in FIG. 9A includes first linkage end 80, which is slidably connected to the detent button 22 via button slot 90 (FIGS. 11A and 11B), and second linkage end 40, which is slidably connected to the detent pin 24 via pin slot 36 (FIG. 6). As can be seen in FIGS. 9A and 5, in order to connect the detent button 22 with the detent pin 24, linkage 30 includes bend 43.

Preferably, linkage 30 is separated into two components, a front linkage portion 96 and a rear linkage portion 98. The front linkage portion 96 and the rear linkage portion 98 are connected to each other by a length adjusting mechanism, such as length adjusting nut 100. The front and rear linkage portions 96 and 98 both have a threaded end portion, where the threads on one linkage portion are right hand threads and those on the other linkage portion are left hand threads. These two threaded end portions are received within a corresponding threaded aperture of the length adjusting nut 100. To adjust the length of the linkage 30 to the desired length, the length adjusting nut 100 is rotated while both the front and rear linkages are attached thereto. When the desired length is obtained, a jam nut 102 is tightened against the length adjusting nut 100 to prevent further movement.

In the preferred embodiment, the linkage length is adjusted so that the detent pin 24 (FIG. 6) starts moving when the miter detent button 22 starts to move downward in direction A (FIG. 11A). Such adjustment can make the length of the linkage exactly equal the necessary distance between miter detent button 22 and the detent pin 24, which exact distance would be very difficult to obtain without some form of adjustment mechanism, due to manufacturing tolerances of the relevant components. Of course, if it is not necessary, the length adjustment mechanism may be omitted in this embodiment, or in any other embodiment.

Figure 9B:
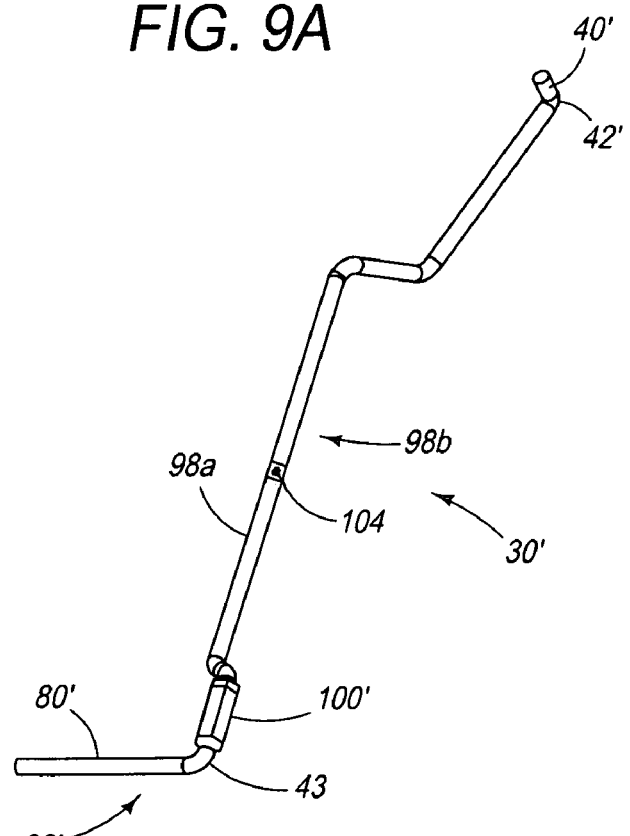
FIG. 9B shows a second embodiment of the linkage of the present invention.

FIG. 9B shows linkage 30', which is a modification of the linkage 30 of FIG. 9A. Linkage 30' preferably includes all of the features of linkage 30, but in linkage 30', the front linkage portion is separated into two sections, 98A and 98B, which are connected to each other by a pivotable connection 104. Thus, in this version of the FIG. 9B embodiment, the linkage 30' is divided into three parts (96', 98A and 98B). In this embodiment, since linkage portion 98B is constrained by linkage guide 34 (FIG. 5) to move only linearly, the pivotable connection 104 makes this configuration operate similar to a slider crank mechanism.

Although linkages made of two or three separate portions have been shown and discussed, it is also contemplated that a single piece linkage may be used, or that a linkage of four or more separate portions may also be used.

One of the benefits of the detent system of the present invention is that squaring the saw blade with respect to the fence 20 is a relatively simple procedure. In many systems, the user must move the fence while squaring the saw, which is difficult because the fence can rotate in one direction and translate in two directions during adjustment.

In contrast, in the present detent system, rotation of the table is the only movement. More specifically, to square the saw blade of the saw blade motor assembly 12 to the fence 20, the user performs the following steps: (1) the user moves and locks the saw into the 90° detent recess; (2) the user loosens the screws that attach the detent carriage assembly 38 to the table 14 (i.e., the screws that pass through slots 70 (FIG. 10) and into threaded bolt apertures 72 (FIG. 8)), which screws are accessible from the upper surface 74 of the table (FIG. 1); (3) the user positions a square between the blade and the fence 20; (4) the user rotates the table 14 until the square shows that the blade is square with the fence; and (5) the user tightens the screws that attach the detent carriage assembly 38 to the table 14.

During the process of squaring the blade to the fence 20, the detent pin 24 will move relative to the linkage 30 because the linkage is constrained by linkage guides 34 to only translate along a line parallel to the blade. To allow for the detent pin 24 to move, the connection between the linkage 30 and the detent pin 24 is preferably in the pin form of a slot, such as slot 36, and not merely a circular aperture. Further, the pin slot 36 is preferably in the form of an arc that is concentric with the miter saw table 14 when the detent pin 24 is engaged with a detent recess 26, such as shown in FIG. 2A. It should be kept in mind that the length of pin slot 36 directly affects the amount of adjustment allowed when squaring the fence to the blade. If linkage 30' is used, the pin slot 36 is no longer needed. Instead, a simple round aperture can be used to connect linkage 30' to detent pin 24.

Figure 12:
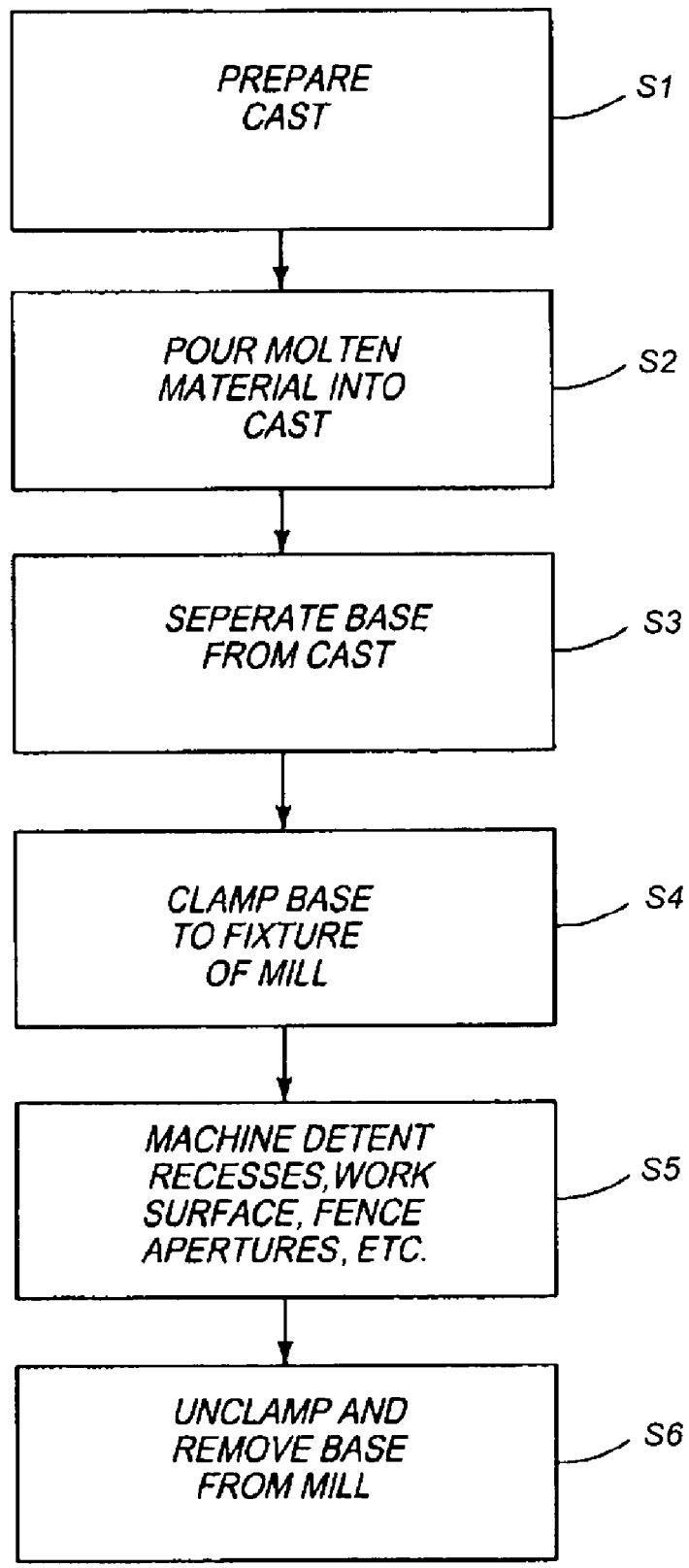
FIG. 12 is a flowchart for explaining one method of making the base, including the detent recesses, of the present invention.

Turning now to the flowchart of FIG. 12, one embodiment of a method of making a base 16 of a miter saw, such as saw 10, will be described. As indicated by Step S1, the first step is to prepare a cast to create base 16. Any desired casting method may be used, such as die casting or permanent mold casting. The prepared cast need not include projections for creating the detent recesses, the fence locating apertures and the pivot aperture within the cast base (but rough features smaller than necessary may be included, if desired). Instead, these features will be machined into the cast base, as discussed below.

Next, in Step S2, the molten material is poured or otherwise introduced into the cast to form the base. Preferably, the molten material is a metal, such as aluminum or iron. In Step S3, the base is separated from the cast, after it has appropriately cooled.

In Step S4, the base is clamped into position in a machining fixture of a CNC mill, or other appropriate machining device. Next, in Step S5, the following features are machined into the base by the mill, while the base remains clamped in the machining fixture: the detent recesses, a plurality of fence locating apertures and a pivot aperture. The work surface is also preferably machined during the same step. The machining of these features, and other features as well, if desired, may take place in any order. However, it is important that all of these features are machined without removing the base from the machining fixture. Accordingly, there is a very high level of accuracy in the positional relationships between these features. Such accuracy is believed to be much higher much than that which can be repeatably obtained if the detent recesses, and other features are simply cast into the base. Finally, after the machining process is completed, the base is unclamped and removed from the machining fixture of the CNC mill, as indicated by Step S6. Thus, the base is now complete, and it can be assembled with the other components of a miter saw to form a completed saw assembly.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A detent system comprising:
    a plurality of detent recesses formed in a first component;
    a detent pin configured and arranged to selectively engage at least one of said detent recesses;
    a linkage operatively connected to said detent pin; and
    a detent button operatively connected to said linkage via a button slot formed within said detent button, said detent button being associated with a second component that is different from said first component, and wherein said first and second components are configured and arranged for relative movement therebetween,
    wherein said button slot is elongated,
    wherein a first end of said linkage is slidably connected to said detent button via said button slot, and
    wherein said detent system is configured and arranged such that applying a force to said detent button to move said detent button in a first direction causes said linkage to move in a second direction, which is different than said first direction, thereby resulting in disengagement between an engaging portion of said detent pin and a relevant one, or more, of said detent recesses.

2. The detent system according to claim 1, wherein said detent system is configured and arranged such that releasing said detent button, thereby allowing said detent button to move in a third direction, caused by movement of said linkage in a fourth direction, which fourth direction is a direction opposite to said second direction, thereby resulting in engagement between said engaging portion of said detent pin and a relevant one, or more, of said detent recesses, thereby hindering relative movement between said first component and said second component.

3. The detent system according to claim 1, wherein a second end of said linkage is operatively connected to said detent pin via a pin slot formed in said detent pin.

4. The detent system according to claim 3, wherein said linkage includes a front linkage portion extending from said first end, a rear linkage portion extending from said second end, and a pivotable connection between said front linkage portion and said rear linkage portion.

5. The detent system according to claim 4, further comprising:
    a length adjusting mechanism between said front linkage portion and said rear linkage portion, wherein said length adjusting mechanism connects said front linkage portion to said rear linkage portion and permits an overall length of said linkage, as measured between said first and second ends of said linkage, to be varied; and
    at least one linkage guide attached to said second component, said at least one linkage guide forming a passageway that receives said linkage, wherein said linkage guide permits translation of said linkage in a direction coinciding with said overall length of said linkage, while restraining movement in a direction transverse to said length direction.

6. The detent system according to claim 3, further comprising:
- a button cradle, wherein said detent button is slidably seated within said button cradle; and
- a cutout portion formed on said button cradle, wherein said cutout portion includes a base portion that is configured and arranged to seat said first end of said linkage,
- wherein said button slot extends in a direction that is oblique to said base portion of said cutout portion, and
- further wherein said obliquely extending button slot, said base portion of said cutout portion and said first end of said linkage cooperate to convert movement of said detent button in said first direction to movement of said linkage in said second direction.

7. The detent system according to claim 1, wherein said detent pin includes:
- a pin slot, wherein said linkage is slidably connected to said detent pin via said pin slot; and
- a through hole configured and arranged to receive a pivot shaft,
- wherein said engaging portion of said detent pin is a generally wedge-shaped projection that extends outwardly from a side of said detent pin.

8. The detent system according to claim 7, further comprising a detent pin carriage assembly, wherein said detent pin carriage assembly includes:
- a detent pin carriage including an aperture configured and arranged to receive said pivot shaft, wherein said pivot shaft rotatably mounts said detent pin to said detent pin carriage; and
- a detent spring operatively connected to both said detent pin carriage and said detent pin, wherein said detent spring is configured and arranged to bias said engaging portion of said detent pin into engagement with one or more of said detent recesses.

9. The detent system according to claim 8, further comprising:
- a detent carriage guide formed in said detent pin carriage;
- a plurality of threaded apertures formed in said detent pin carriage;
- a detent carriage track formed in said table; and
- a plurality of bolt slots formed in said table,
- wherein said detent carriage guide is configured to cooperate with said detent carriage track to permit said detent pin carriage to slide thereon, and said bolt slots are aligned with said threaded apertures to permit threaded members to be passed therethrough to secure said detent carriage to said table.

10. The detent system according to claim 1, wherein said detent recesses are formed along an arc, and further wherein said relative movement between said first and second components is rotary movement.

11. The detent system according to claim 10, wherein:
- said first component is a base of a miter saw; and
- said second component is a table of a miter saw.

12. A detent system comprising:
- a plurality of detent recesses formed in a first component;
- a detent pin configured and arranged to selectively engage at least one of said detent recesses;
- a linkage operatively connected to said detent pin;
- a detent button operatively connected to said linkage, said detent button being associated with a second component that is different from said first component, and wherein said first and second components are configured and arranged for relative movement therebetween; and
- a slot formed in at least one of said detent button and said detent pin, wherein said slot slidably receives an end portion of said linkage,
- wherein said detent system is configured and arranged such that applying a force to said detent button to move said detent button in a first direction causes said linkage to move in a second direction, which is different than said first direction, thereby resulting in disengagement between an engaging portion of said detent pin and a relevant one, or more, of said detent recesses,
- wherein said detent system further comprises:
- a button cradle, wherein said detent button is slidably seated within said button cradle; and
- a cutout portion formed on said button cradle, wherein said cutout portion includes a base portion that is configured and arranged to seat a first end of said linkage,
- wherein said slot comprises a button slot formed in said detent button, and further wherein said button slot extends in a direction that is oblique to said base portion of said cutout portion.

13. A detent system comprising:
- a plurality of detent recesses formed in a first component;
- a detent pin configured and arranged to selectively engage at least one of said detent recesses;
- a linkage operatively connected to said detent pin;
- a detent button operatively connected to said linkage, said detent button being associated with a second component that is different from said first component, and wherein said first and second components are configured and arranged for relative movement therebetween; and
- a slot formed in at least one of said detent button and said detent pin, wherein said slot slidably receives an end portion of said linkage,
- wherein said detent system is configured and arranged such that applying a force to said detent button to move said detent button in a first direction causes said linkage to move in a second direction, which is different than said first direction, thereby resulting in disengagement between an engaging portion of said detent pin and a relevant one, or more, of said detent recesses,
- a detent pin carriage assembly, wherein said detent pin carriage assembly includes:
- a through hole formed in said detent pin, wherein said through hole is configured and arranged to receive a pivot shaft,
- a detent pin carriage including an aperture configured and arranged to receive said pivot shaft, wherein said pivot shaft rotatably mounts said detent pin to said detent pin carriage; and
- a detent spring operatively connected to both said detent pin carriage and said detent pin, wherein said detent spring is configured and arranged to bias said engaging portion of said detent pin into engagement with one or more of said detent recesses,
- wherein said slot is a pin slot formed in said detent pin.

14. A detent system comprising:
- a plurality of detent recesses formed in a first component;
- a detent pin configured and arranged to selectively engage at least one of said detent recesses;
- a linkage operatively connected to said detent pin;
- a detent button operatively connected to said linkage, said detent button being associated with a second component that is different from said first component, and wherein said first and second components are configured and arranged for relative movement therebetween;

a slot formed in at least one of said detent button and said detent pin, wherein said slot slidably receives an end portion of said linkage, wherein said detent system is configured and arranged such that applying a force to said detent button to move said detent button in a first direction causes said linkage to move in a second direction, which is different than said first direction, thereby resulting in disengagement between an engaging portion of said detent pin and a relevant one, or more, of said detent recesses, a detent pin carriage for rotatably seating said detent pin;

a detent spring for biasing said detent pin;

a detent carriage guide formed in said detent pin carriage;

a plurality of threaded apertures formed in said detent pin carriage;

a detent carriage track formed in said table; and a plurality of bolt slots formed in said table, wherein said detent carriage guide is configured to cooperate with said detent carriage track to permit said detent pin carriage to slide thereon, and said bolt slots are aligned with said threaded apertures to permit threaded members to be passed therethrough to secure said detent carriage to said table.

15. The detent system according to claim 12, wherein:
said first component is a base of a miter saw; and
said second component is a table of a miter saw.

16. A detent system comprising:
a plurality of detent recesses formed in a first component;
a detent pin configured and arranged to selectively engage at least one of said detent recesses;
a linkage operatively connected to said detent pin;
a detent button operatively connected to said linkage, said detent button being associated with a second component that is different from said first component, and wherein said first and second components are configured and arranged for relative movement therebetween; and
a slot formed in at least one of said detent button and said detent pin, wherein said slot slidably receives an end portion of said linkage, wherein said detent system is configured and arranged such that applying a force to said detent button to move said detent button in a first direction causes said linkage to move in a second direction, which is different than said first direction, thereby resulting in disengagement between an engaging portion of said detent pin and a relevant one, or more, of said detent recesses, wherein said linkage includes a front linkage portion and a rear linkage portion, and further wherein said front linkage portion is pivotably connected to said rear linkage portion.

* * * * *